US012080944B2

(12) United States Patent
Odes

(10) Patent No.: US 12,080,944 B2
(45) Date of Patent: Sep. 3, 2024

(54) ISOLATION BETWEEN ANTENNAS USING ELECTROMAGNETIC POLARIZERS

(71) Applicant: GM GLOBAL TECHNOLOGY OPERATIONS LLC, Detroit, MI (US)

(72) Inventor: Uriel Z. Odes, Givaat Shmuel (IL)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 17/981,991

(22) Filed: Nov. 7, 2022

(65) Prior Publication Data

US 2024/0154304 A1 May 9, 2024

(51) Int. Cl.
*H01Q 1/52* (2006.01)
*H01Q 15/24* (2006.01)

(52) U.S. Cl.
CPC ........... *H01Q 1/525* (2013.01); *H01Q 15/242* (2013.01)

(58) Field of Classification Search
CPC .... H01Q 15/02; H01Q 15/0093; H01Q 15/12; H01Q 15/22; H01Q 15/24; H01Q 15/242; H01Q 15/244; H01Q 15/246; H01Q 19/06; H01Q 1/52; H01Q 1/521; H01Q 1/525; H01Q 5/20; H01Q 5/28; H01Q 9/04; H01Q 9/0428; H01Q 9/0492; H01Q 21/24; H01Q 21/245; H04B 7/10; H04B 7/15571; H04B 14/002; H04B 14/008
See application file for complete search history.

(56) References Cited

U.S. PATENT DOCUMENTS 5,828,344 A * 10/1998 Alder ................. H01Q 21/0031 343/756
2006/0082511 A1* 4/2006 Osterhues .............. H01Q 15/24 343/756
2016/0064829 A1* 3/2016 Schaepperle ........ H01Q 9/0435 343/893
2022/0352622 A1* 11/2022 Choudhury .......... H01Q 1/3275
2024/0063550 A1* 2/2024 Algaba Brazalez ... H01Q 15/02

* cited by examiner

*Primary Examiner* — Jason M Crawford
(74) *Attorney, Agent, or Firm* — Quinn IP Law

(57) ABSTRACT

An antenna system includes a first antenna operational to transmit a first radio-frequency signal, a second antenna operational to receive a second radio-frequency signal and receive the first radio-frequency signal, a first electromagnetic polarizer disposed between the first antenna and the second antenna and operational to change a polarization of the first radio-frequency signal, a second electromagnetic polarizer disposed between the first electromagnetic polarizer and the second antenna and operational to further change the polarization of the first radio-frequency signal, and a conductive ground plane disposed on a ground side of the first antenna and the second antenna. The conductive ground plane defines a gap between the first antenna and the second antenna. The gap extends under the first electromagnetic polarizer. The gap extends under the second electromagnetic polarizer. A horizontal component of the second polarization of the first radio-frequency signal is maintained across the gap.

20 Claims, 5 Drawing Sheets

ISOLATION BETWEEN ANTENNAS USING ELECTROMAGNETIC POLARIZERS

INTRODUCTION

The present disclosure relates to a system and a method for isolation between antennas using electromagnetic polarizers.

Absorbing materials or conducting structures are sometimes used between neighboring antennas to achieve better inter-antenna isolation. Both techniques act as a barrier that disturbs radio signals flowing between the antennas. The barriers either reduce the signal strengths or shift radiation patterns away from the other antenna. Both techniques disrupt antenna radiation patterns.

Accordingly, those skilled in the art continue with research and development efforts in the field of reducing interference between commonly located antennas that transmit and receive at similar frequencies.

SUMMARY

An antenna system is provided herein. The antenna system includes a first antenna, a second antenna, a first electromagnetic polarizer, a second electromagnetic polarizer, and a conductive ground plane. The first antenna is operational to transmit a first radio-frequency signal with a first polarization. The second antenna is operational to receive a second radio-frequency signal with the first polarization and receive the first radio-frequency signal. The first radio-frequency signal would disrupt conversion of the second radio-frequency signal to a useable form if the first radio-frequency signal is received unattenuated at the second antenna. The first electromagnetic polarizer is disposed between the first antenna and the second antenna and operational change the first polarization of the first radio-frequency signal to a second polarization. The second polarization is offset relative to the first polarization by a first predetermined angle. The second electromagnetic polarizer is disposed between the first electromagnetic polarizer and the second antenna and operational change the second polarization of the first radio-frequency signal to a third polarization. The third polarization is offset relative to the first polarization by a second predetermined angle. The first electromagnetic polarizer and the second electromagnetic polarizer attenuate the first radio-frequency signal at the second antenna so that the second radio-frequency signal is convertible to the useable form. The conductive ground plane is disposed on a ground side of the first antenna and the second antenna. The conductive ground plane defines a gap between the first antenna and the second antenna. The gap extends under the first electromagnetic polarizer. The gap extends under the second electromagnetic polarizer. A horizontal component of the second polarization of the first radio-frequency signal is maintained across the gap.

In one or more embodiments of the antenna system, the first electromagnetic polarizer is operational to pass a first component of the first radio-frequency signal, and reject a second component of the first radio-frequency signal.

In one or more embodiments of the antenna system, the second electromagnetic polarizer is operational to pass a third component of the first radio-frequency signal, and reject a fourth component of the first radio-frequency signal.

In one or more embodiments of the antenna system, a portion of the first radio-frequency signal transmitted by the first antenna toward the second antenna is attenuated approximately 20 decibels after passing through the first electromagnetic polarizer and the second electromagnetic polarizer, relative to free space attenuation between the first antenna and the second antenna.

In one or more embodiments of the antenna system, the second predetermined angle is approximately perpendicular to the first predetermined angle.

In one or more embodiments of the antenna system, the first predetermined angle is slanted approximately 45 degrees relative to the conductive ground plane, and the second predetermined angle is slanted approximately −45 degrees relative to the conductive ground plane.

In one or more embodiments of the antenna system, the first electromagnetic polarizer is operational to change the first radio-frequency signal from a circular polarization to a linear polarization at the first predetermined angle.

In one or more embodiments of the antenna system, the second electromagnetic polarizer is operational to change the first radio-frequency signal from the linear polarization to the circular polarization, and reject a component of the first radio-frequency signal.

In one or more embodiments of the antenna system, the first antenna and the second antenna are mounted on a vehicle.

A method for establishing isolation between antennas is provided herein. The method includes transmitting a first radio-frequency signal with a first polarization from a first antenna, receiving a second radio-frequency signal with the first polarization at a second antenna, and receiving the first radio-frequency signal at the second antenna. The first radio-frequency signal would disrupt conversion of the second radio-frequency signal to a useable form if the first radio-frequency signal is received unattenuated at the second antenna. The method further includes changing the first polarization of the first radio-frequency signal to a second polarization with a first electromagnetic polarizer. The first electromagnetic polarizer is disposed between the first antenna and the second antenna. The second polarization is offset relative to the first polarization by a first predetermined angle. The method includes changing the second polarization of the first radio-frequency signal to a third polarization with a second electromagnetic polarizer. The second electromagnetic polarizer is disposed between the first electromagnetic polarizer and the second antenna. The third polarization is offset relative to the first polarization by a second predetermined angle. The first electromagnetic polarizer and the second electromagnetic polarizer attenuate the first radio-frequency signal at the second antenna so that the second radio-frequency signal is convertible to the useable form. The method further includes maintaining a horizontal component of the second polarization of the first radio-frequency signal across a gap in a conductive ground plane. The conductive ground plane is disposed on a ground side of the first antenna and the second antenna. The conductive ground plane defines the gap between the first antenna and the second antenna. The gap extends under the first electromagnetic polarizer. The gap extends under the second electromagnetic polarizer.

In one or more embodiments of the method, the changing of the first polarization of the first radio-frequency signal includes passing a first component of the first radio-frequency signal through the first electromagnetic polarizer, and rejecting a second component of the first radio-frequency signal with the first electromagnetic polarizer.

In one or more embodiments of the method, the changing of the second polarization of the first radio-frequency signal includes passing a third component of the first radio-frequency signal through the second electromagnetic polarizer, and rejecting a fourth component of the first radio-frequency signal with the second electromagnetic polarizer.

In one or more embodiments, the method further includes attenuating a portion of the first radio-frequency signal transmitted by the first antenna toward the second antenna by approximately 20 decibels with the first electromagnetic polarizer and the second electromagnetic polarizer, relative to free space attenuation between the first antenna and the second antenna.

In one or more embodiments of the method, the second predetermined angle is approximately perpendicular to the first predetermined angle.

In one or more embodiments of the method, the first predetermined angle is slanted approximately 45 degrees relative to the conductive ground plane, and the second predetermined angle is slanted approximately −45 degrees relative to the conductive ground plane.

In one or more embodiments of the method, the changing of the first polarization of the first radio-frequency signal includes changing the first radio-frequency signal from a circular polarization to a linear polarization at the first predetermined angle with the first electromagnetic polarizer.

In one or more embodiments of the method, the changing of the second polarization of the first radio-frequency signal includes changing the first radio-frequency signal from the linear polarization to the circular polarization with the second electromagnetic polarizer, and rejecting a component of the first radio-frequency signal with the second electromagnetic polarizer.

A vehicle is provided herein. The vehicle includes an exterior surface, a first antenna, a second antenna, a first electromagnetic polarizer, a second electromagnetic polarizer and a conductive ground plane. The first antenna is disposed on the exterior surface and operational to transmit a first radio-frequency signal with a first polarization. The second antenna is disposed on the exterior surface and operational to receive a second radio-frequency signal with the first polarization and receive the first radio-frequency signal. The first radio-frequency signal would disrupt conversion of the second radio-frequency signal to a useable form if the first radio-frequency signal is received unattenuated at the second antenna. The first electromagnetic polarizer is disposed between the first antenna and the second antenna and operational change the first polarization of the first radio-frequency signal to a second polarization, wherein the second polarization is offset relative to the first polarization by a first predetermined angle. The second electromagnetic polarizer is disposed between the first electromagnetic polarizer and the second antenna and operational change the second polarization of the first radio-frequency signal to a third polarization. The third polarization is offset relative to the first polarization by a second predetermined angle. The first electromagnetic polarizer and the second electromagnetic polarizer attenuate the first radio-frequency signal at the second antenna so that the second radio-frequency signal is convertible to the useable form. The conductive ground plane is disposed on a ground side of the first antenna and the second antenna. The conductive ground plane defines a gap between the first antenna and the second antenna. The gap extends under the first electromagnetic polarizer. The gap extends under the second electromagnetic polarizer. A horizontal component of the second polarization of the first radio-frequency signal is maintained across the gap.

In one or more embodiments of the vehicle, the first antenna and the second antenna are aligned parallel to a longitudinal axis of the vehicle.

In one or more embodiments of the vehicle, the first radio-frequency signal is a vehicle-to-vehicle signal and the second radio-frequency signal is a Wi-Fi signal.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide an antenna system and/or isolation method that reduces a probability that a signal being transmitted from one antenna corrupts another signal being simultaneously received by a neighboring (or co-existing) antenna. In a vehicle, different antennas that operate in the same bands or near-by bands (such as Wi-Fi, vehicle-to-vehicle and vehicle-to-everything) are provided with a significant degree of inter-antenna isolation for proper operation. The antenna system increases an electromagnetic isolation between two antennas by mounting a +45 degree electromagnetic polarizer adjacent to one antenna and mounting a −45 degree electromagnetic polarizer adjacent to the other antenna. The electromagnetic polarizers may be limited to a small range between the antennas, therefor effecting a certain angle of the radiation patterns. The electromagnetic polarizers generally reduce the vertical polarization of the original signals in the angle by approximately 3 decibels. Mounting the polarizations facing each may increase the isolation between the antennas by approximately 20 decibels.

Figure 1:
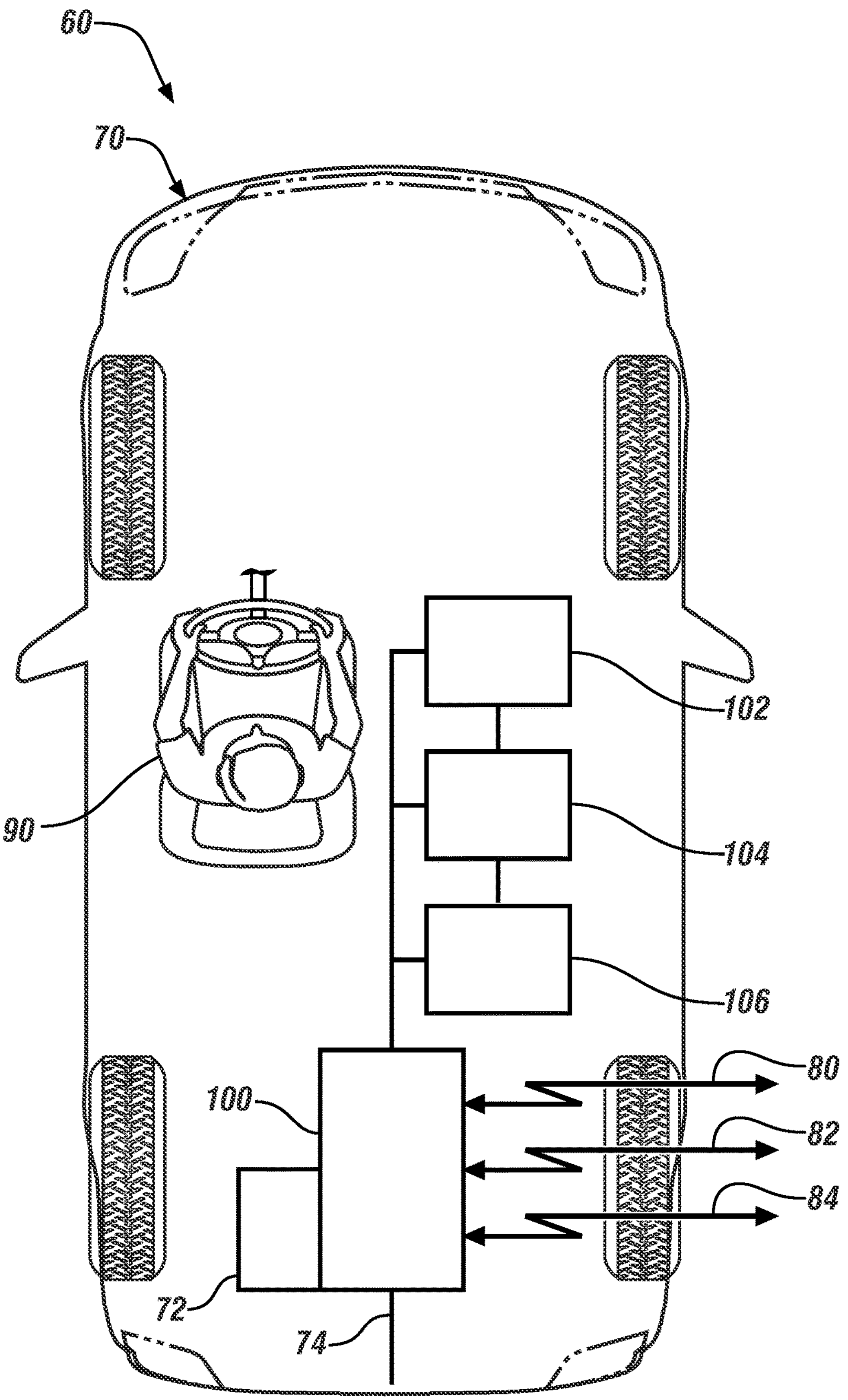
FIG. 1 is a schematic plan diagram of a context of an environment around a vehicle in accordance with one or more exemplary embodiments.

Referring to FIG. 1, a schematic plan diagram of an example context of an environment 60 around a vehicle 70 is shown in accordance with one or more exemplary embodiments. The vehicle 70 resides on the ground (e.g., a roadway) at a current location. The vehicle 70 generally includes an exterior surface 72 and may define a longitudinal axis 74. A driver 90 and one or more passengers (not shown) may reside inside the vehicle 70.

The vehicle 70 includes an antenna system 100, a first transceiver 102, a second transceiver 104 and a controller 106. Vehicle-to-vehicle (V2V) bidirectional communication 80 may be established between the antenna system 100 and the neighboring vehicles. Vehicle-to-everything (V2X) bidirectional communication 82 may be established between the antenna system 100 and other equipment, such as computers, networks, relay stations, and the like. Wi-Fi bidirectional communications 84 may be established between the antenna system 100 and other Wi-Fi nodes. Oher types of radio-frequency communications may be established between the antenna system 100 and other radio-frequency receivers, transmitters and/or transceivers to meet the design criteria of a particular application.

The vehicle 70 implements a gas-powered vehicle, an electric vehicle, a hybrid vehicle, or a plug-in hybrid vehicle. In various embodiments, the vehicle 70 may include, but is not limited to, a passenger vehicle, a truck, an autonomous vehicle, a motorcycle, a boat, and/or an aircraft. Other types of vehicles 70 may be implemented to meet the design criteria of a particular application.

The antenna system 100 implements a multi-antenna array that enables simultaneous communications on multiple radio frequencies. The antenna system includes at least a first antenna, a second antenna, a first electromagnetic polarizer, a second electromagnetic polarizer and an optional conductive ground plane mounted on and/or inside the vehicle 70. The first antenna is operational to transmit and receive a first radio-frequency signal (e.g., a V2V signal, a V2X signal or a Wi-Fi signal) with a first polarization. The second antenna is operational to transmit and receive a second radio-frequency signal (e.g., a V2V signal, a V2X signal or a Wi-Fi signal) with the first polarization. The first electromagnetic polarizer is disposed between the first antenna and the second antenna. The first electromagnetic polarizer is operational change the first polarization of the first radio-frequency signal heading toward the second electromagnetic polarizer to a second polarization. The second electromagnetic polarizer is disposed between the first electromagnetic polarizer and the second antenna. The second electromagnetic polarizer is operational change the second polarization of the first radio-frequency signal heading toward the second antenna to a third polarization. The first radio-frequency signal with the third polarization may be received by the second antenna. Where implemented, the conductive ground plane is disposed on a ground side of the first antenna and the second antenna. The conductive ground plane may define a gap between the first antenna and the second antenna. The gap extends under the first electromagnetic polarizer, and the gap extends under the second electromagnetic polarizer. The conductive ground plane is operational to maintain a horizontal component of the first radio-frequency signal across the gap. A combination of the electromagnetic polarizers and the conductive ground plane with the gap generally attenuate the first radio-frequency signal at the second antenna by at least 20 decibels, relative to the same antenna system without the electromagnetic polarizers. In a similar fashion, the combination of the electromagnetic polarizers and the conductive ground plane with the gap generally attenuate the second radio-frequency signal at the first antenna by at least 20 decibels, relative to the same antenna system without the electromagnetic polarizers.

The first transceiver 102 implements a radio-frequency transmitter and receiver. The first transceiver 102 is electrically coupled to the first antenna in the antenna system 100, and is operational to alternatively transmit and receive the first radio-frequency signal via the first antenna. In various embodiments, the first radio-frequency signal may implement the V2V bidirectional communications 80, the V2X bidirectional communications 82, the Wi-Fi bidirectional communications 84, or other radio-frequency bidirectional communications with nodes external to the vehicle 70.

The second transceiver 104 implements another radio-frequency transmitter and receiver. The second transceiver 104 is electrically coupled to the second antenna in the antenna system 100, and is operational to alternatively transmit and receive the second radio-frequency signal via the second antenna. In various embodiments, the second radio-frequency signal may implement the V2V bidirectional communications 80, the V2X bidirectional communications 82, the Wi-Fi bidirectional communications 84, or other radio-frequency bidirectional communications with nodes external to the vehicle 70.

The controller 106 implements one or more electronic control units. The controller 106 is in electrical communication with the first transceiver 102 and the second transceiver 104. In various embodiments, the controller 106 may be implemented in a body controller of the vehicle 70. The controller 106 is operational to relay digital signals to and from the first transceiver 102 and the second transceiver 104 for the V2V bidirectional communications 80, the V2X bidirectional communications 82, and/or the Wi-Fi bidirectional communications 84.

In various embodiments, the controller 106 generally comprises at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be an electronic processor (implemented in hardware, software executing on hardware, or a combination of both). The at least one microcontroller may also include tangible, non-transitory memory (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the at least one microcontroller (either in the foreground or background). The at least one microcontroller may receive commands and information, in the form of one or more input signals from various controls or components in the vehicle 70 and communicate instructions to the other electronic components.

Figure 2:
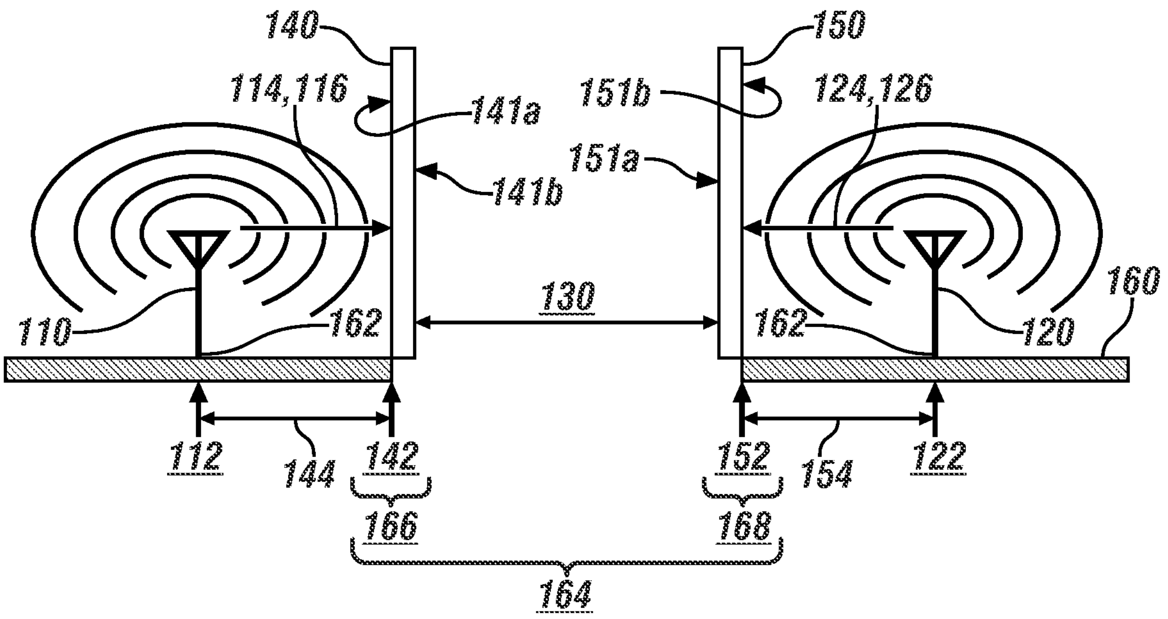
FIG. 2 is a schematic diagram of an antenna system in accordance with one or more exemplary embodiments.
Figure 3:
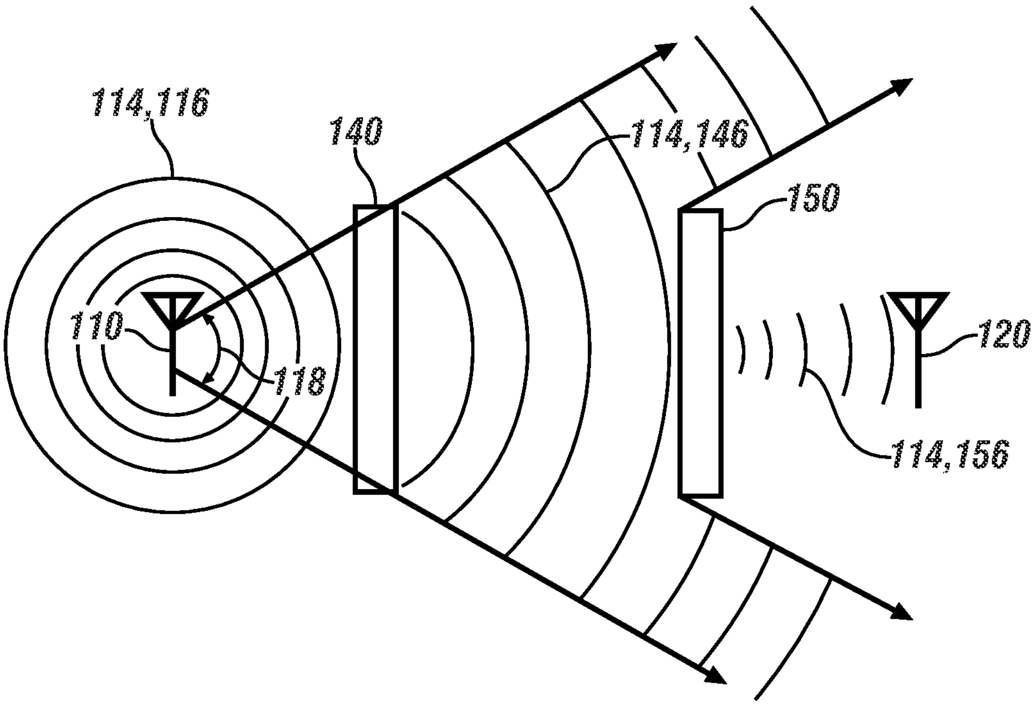
FIG. 3 is a schematic plan view of the antenna system in accordance with one or more exemplary embodiments.
Figure 4:
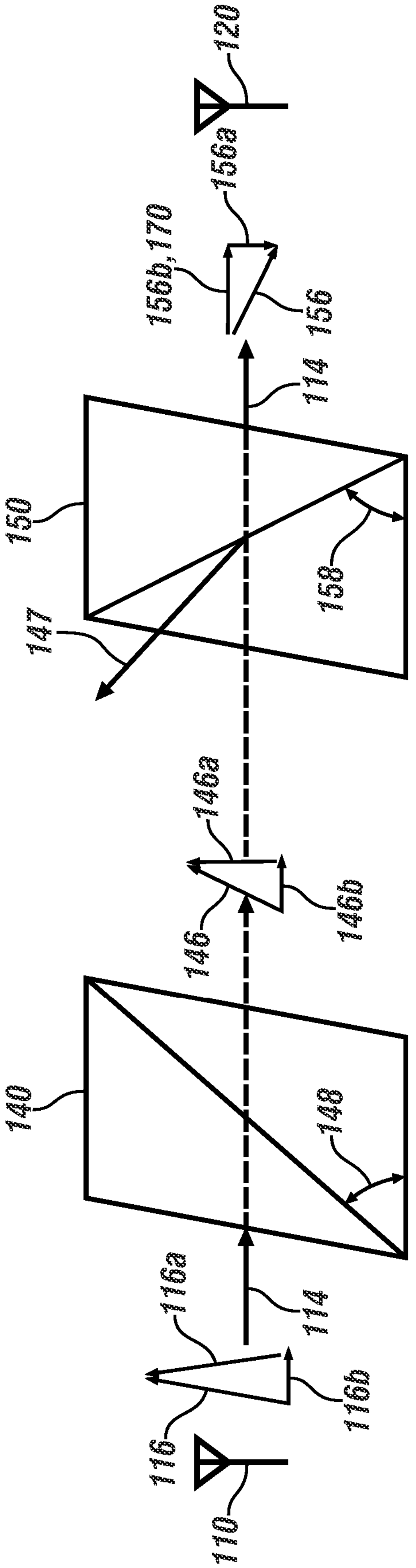
FIG. 4 is a schematic diagram of linear-to-linear electromagnetic polarizers in accordance with one or more exemplary embodiments.

Referring to FIG. 2, a schematic diagram of an example implementation of the antenna system 100 is shown in accordance with one or more exemplary embodiments. Referring to FIG. 3 a schematic plan view of the antenna system 100 is shown in accordance with one or more exemplary embodiments. Referring to FIG. 4, a schematic diagram of an example linear-to-linear electromagnetic polarizers is shown in accordance with one or more exemplary embodiments. The antenna system 100 includes at least the first antenna 110, the second antenna 120 and the conductive ground plane 160 (where implemented). Additional antennas may be implemented to meet the design criteria of a particular application.

The first antenna 110 is located at a first antenna position 112 near the conductive ground plane 160. The first antenna position 112 may be inside or outside the vehicle 70. The first antenna 110 transmits and receives a first radio-frequency signal 114 at a first frequency with a first polarization 116. The first antenna 110 may define a ground side 162. In various embodiments, the first polarization 116 may be a vertical polarization. In some embodiments, the first polarization 116 may be circular (e.g., left-handed or right-handed) or elliptical. In still other embodiments, the first polarization 116 may be horizontal. Other directions of the first polarization 116 may be implemented to meet the design criteria of a particular application. As illustrated in FIG. 3, the first radio-frequency signal 114 within an angle of coverage 118 may interact with the first electromagnetic polarizer 140. The first radio-frequency signal 114 outside the angle of coverage 118 is not affected by the first electromagnetic polarizer 140.

The second antenna 120 is located at a second antenna position 122 near the conductive ground plane 160. The second antenna position 122 may be inside or outside the vehicle 70. The second antenna 120 transmits and receives a second radio-frequency signal 124 at a second frequency with another polarization 126. The second antenna 120 may define a same ground side 162 as the first antenna 110. The second frequency may be a similar frequency, or a same frequency as the first frequency (e.g., the first antenna 110 provides an in-cabin Wi-Fi antenna and the second antenna 120 provides an external Wi-Fi antenna. In various embodiments, the other polarization 126 may be a same polarization (e.g., vertical) as the first polarization 116. In some embodiments, the polarization 126 may be circular (e.g., left-handed or right-handed) or elliptical. In still other embodiments, the other polarization 126 may be horizontal. Other directions of the other polarization 126 may be implemented to meet the design criteria of a particular application. Similar to the first radio-frequency signal 114, the second radio-frequency signal 124 within a corresponding angle of coverage may interact with the second electromagnetic polarizer 150. The second radio-frequency signal 124 outside the angle of coverage is not affected by the second electromagnetic polarizer 150.

An alignment direction 130 may be defined between the first antenna 110 and the second antenna 120. In some embodiments, the alignment direction 130 may be parallel to the longitudinal axis 74 of the vehicle 70. In other embodiments, the alignment direction 130 may be non-parallel (e.g., perpendicular) to the longitudinal axis 74 of the vehicle 70.

The first electromagnetic polarizer 140 implements a linear-to-linear electromagnetic polarizer, a circular-to-linear electromagnetic polarizer, or a linear-to-circular electromagnetic polarizer. In various embodiments, the first electromagnetic polarizer 140 may implement a wire grid. The first electromagnetic polarizer 140 is operational to change a polarization of the first radio-frequency signal 114 within the angle of coverage 118 from the first polarization 116 to a second polarization 146. In cases of linear-to-linear polarization, the first radio-frequency signal 114 may be considered to have a vertical first component **116*a* and possibly a small horizontal first component 116*b*. The second polarization 146 may be spatially rotated while travelling from a first side 141*a* of the first electromagnetic polarizer 140 to a second side 141*b* of the first electromagnetic polarizer 140. The spatial rotation may be to a first predetermined angle 148 on the second side 141*b* relative to the conductive ground plane 160. For example, the first electromagnetic polarizer 140 may rotate the polarization of the first radio-frequency signal 114 by 40 to 50 degrees (e.g., 45 degrees). The first radio-frequency signal 114, were viewed between the first electromagnetic polarizer 140 and the second electromagnetic polarizer 150 (e.g., with the second polarization 146), may be considered to have a rotated second component 146*a* and a nonrotated second component 146*b*. The vertical component of the rotated second component 146*a* may be an attenuated version of the vertical first component 116*a*** by approximately −3 decibels.

The first electromagnetic polarizer 140 is located between the first antenna 110 and the second antenna 120 at a first electromagnetic polarizer position 142 along the alignment direction 130. In various embodiments, a first separation 144 between the first antenna 110 and the first electromagnetic polarizer 140 may be approximately a quarter wavelength of the first radio-frequency signal 114. In various embodiments, an attenuation of the first radio-frequency signal 114 passing through the first electromagnetic polarizer 140 may be −3 decibels (e.g., the polarization of the first electromagnetic polarizer 140 is offset from the first polarization 116 of the first antenna 110 by approximately 45 degrees).

The second electromagnetic polarizer 150 implements another linear-to-linear electromagnetic polarizer, a circular-to-linear electromagnetic polarizer, or a linear-to-circular electromagnetic polarizer. In various embodiments, the second electromagnetic polarizer 150 may implement another wire grid. The second electromagnetic polarizer 150 is operational to change a polarization of the first radio-frequency signal 114 from the second polarization 146 to a third polarization 156. In cases of linear-to-linear polarization, the third polarization 156 may be spatially rotated while travelling from a third side **151*a* of the second electromagnetic polarizer 150 to a fourth side 151*b* of the second electromagnetic polarizer 150. The spatial rotation may be to a second predetermined angle 158 relative to the conductive ground plane 160. For example, the second electromagnetic polarizer 150 may rotate the polarization of the first radio-frequency signal 114 leaking through the first electromagnetic polarizer 140 by −40 to −50 degrees (e.g., −45 degrees). In other words, an orientation (or slant) of the third side 151*a* of the second electromagnetic polarizer 150 is rotated approximately 90 degrees (e.g., perpendicular) to the orientation (or slant) of the second side 141*b* of the first electromagnetic polarizer 140. The second electromagnetic polarizer 150 has a polarization that is perpendicular to the first electromagnetic polarizer 140 and so rejects most of the first radio-frequency signal 114 with the second polarization. The first radio-frequency signal 114, where viewed between the first electromagnetic polarizer 140 and the second electromagnetic polarizer 150, may be considered to have the rotated second component 146*a* and the nonrotated second component 146*b*. A fourth component 147 of the first radio-frequency signal 114 (e.g., a component not aligned with the polarization of the second electromagnetic polarizer 150 on the third side 151*a*) may be rejected by the second electromagnetic polarizer 150. The rejected fourth component 147 may be up to 98.5 percent of the signal. The first radio-frequency signal 114, where viewed between the second electromagnetic polarizer 150 and the second antenna 120 (e.g., with the third polarization 156), may be considered to have a rotated third component 156*a* and a nonrotated third component 156*b*. The rotated third component 156*a* may be an attenuated version of the rotated second component 146*a***.

The second electromagnetic polarizer 150 is located between the first electromagnetic polarizer 140 and the second antenna 120 at a second electromagnetic polarizer position 152 along the alignment direction 130. In various embodiments, a second separation 154 between the second antenna 120 and the second electromagnetic polarizer 150 may be approximately a quarter wavelength of the second radio-frequency signal 124. In various embodiments, an attenuation of the second radio-frequency signal 124 passing through the second electromagnetic polarizer 150 may be −3 decibels (e.g., the polarization of the second electromagnetic polarizer 150 is offset from the polarization 126 of the second antenna 120 by approximately 45 degrees). In various embodiments, the first electromagnetic polarizer 140 and the second electromagnetic polarizer 150 may be copies of each other and mounted with different orientations.

The conductive ground plane 160 is positioned on the ground side 162 of the first antenna 110 and the second antenna 120. The conductive ground plane 160 is generally operational to improve the operations of the first antenna 110 and the second antenna 120. A gap 164 is defined in the conductive ground plane. The gap 164 includes a first area 166 that extends under the first electromagnetic polarizer 140 and a second area 168 that extends under the second electromagnetic polarizer 150. The gap 164 within the conductive ground plane 160 helps maintain a horizontal component 170 (e.g., the horizontal component of the rotated second component 146*a*) of the first radio-frequency signal 114 across the gap 164 (FIG. 2) (e.g., maintains between and under the electromagnetic polarizers 140 and 150). Where the conductive ground plane 160 is not implemented, the first antenna 110 and the second antenna 120 may be treated as residing in free space. A size of the first electromagnetic polarizer 140 and a size of the second electromagnetic polarizer 150 may also be extended to below the bottoms of the first antenna 110 and the second antenna 120 as the conductive ground plane 160 is absent.

A total attenuation of the first radio-frequency signal 114 as transmitted from the first antenna 110 until reception by the second antenna 120 may be at least 20 decibels, relative to the same antenna system without the electromagnetic polarizers (e.g., a free space attenuation between the first antenna 110 and the second antenna 120 without implementation of the first electromagnetic polarizer 140 and the second electromagnetic polarizer 150). Therefore, while the first transceiver 102 and the first antenna 110 are transmitting and the second transceiver 104 and the second antenna 120 are receiving, the first radio-frequency signal 114 may be attenuated to a point where the first radio-frequency signal 114 would not disrupt conversion of the second radio-frequency signal 124 to a useable form in the second transceiver 104. Without the attenuation of the first electromagnetic polarizer 140 and the second electromagnetic polarizer 150, the second transceiver 104 may be unable to distinguish between the first radio-frequency signal 114 and the second radio-frequency signal 124. Likewise, while the first transceiver 102 and the first antenna 110 are receiving and the second transceiver 104 and the second antenna 120 are transmitting, the second radio-frequency signal 124 may be attenuated to a point where the second radio-frequency signal 124 would not disrupt conversion of the first radio-frequency signal 114 to a useable form in the first transceiver 102.

In some embodiments, the first antenna 110, the first electromagnetic polarizer 140, the second electromagnetic polarizer 150 and the second antenna 120 are positioned along a flat plane. The flat plane may be on the exterior surface 72 (FIG. 1) of the vehicle 70, such as the roof, or another flat surface inside or outside the vehicle 70. In contrast, if the two antennas 110 and 120 are placed on a curved surface, the electromagnetic polarizers 140 and 150 may not be aligned, the polarizations may not be perpendicular to each other, and so the attenuation performance is decreased. In such cases, the electromagnetic polarizers 140 and 150 may be positioned so that the facing surfaces (e.g., 141*b* and 151*a* in FIG. 2) are parallel to each other and therefore the polarizations would be perpendicular to each other.

Figure 5:
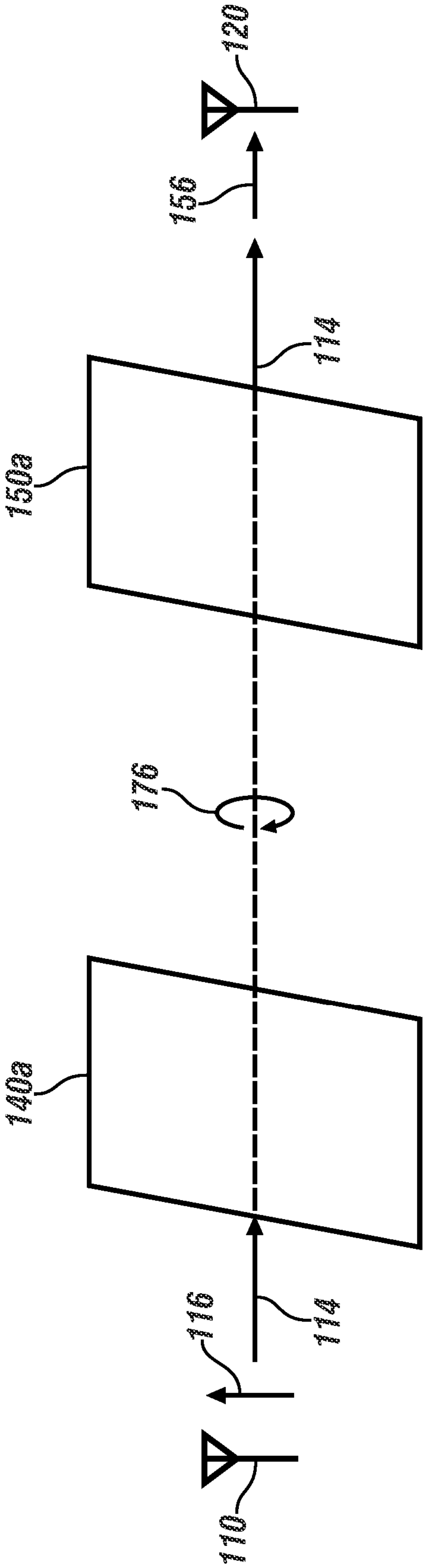
FIG. 5 is a schematic diagram of linear-to-circular and circular-to-linear electromagnetic polarizers in accordance with one or more exemplary embodiments.

Referring to FIG. 5, a schematic diagram of an example linear-to-circular and circular-to-linear electromagnetic polarizers is shown in accordance with one or more exemplary embodiments. A linear-to-circular type of first electromagnetic polarizer 140*a* may convert the first radio-frequency signal 114 from the first polarization 116 to a circular polarization 176 (e.g., left-handed or right handed). A circular-to-linear type of second electromagnetic polarizer 150*a*, with a circular polarization perpendicular to that of the first circular-to-linear electromagnetic polarizer 140*a* (e.g., right-handed or left-handed), rejects most of the first radio-frequency signal 114 and converts a minor portion of the first radio-frequency signal 114 from the circular polarization 176 to the third polarization 156. An attenuation of the first radio-frequency signal 114 through the first electromagnetic polarizer 140*a* and the second electromagnetic polarizer 150*a* may be at least 20 decibels, relative to free space attenuation between the first antenna 110 and the second antenna 120. In various embodiments, the first electromagnetic polarizer 140*a* and the second electromagnetic polarizer 150*a* may be copies of each other and mounted with different orientations.

Figure 6:
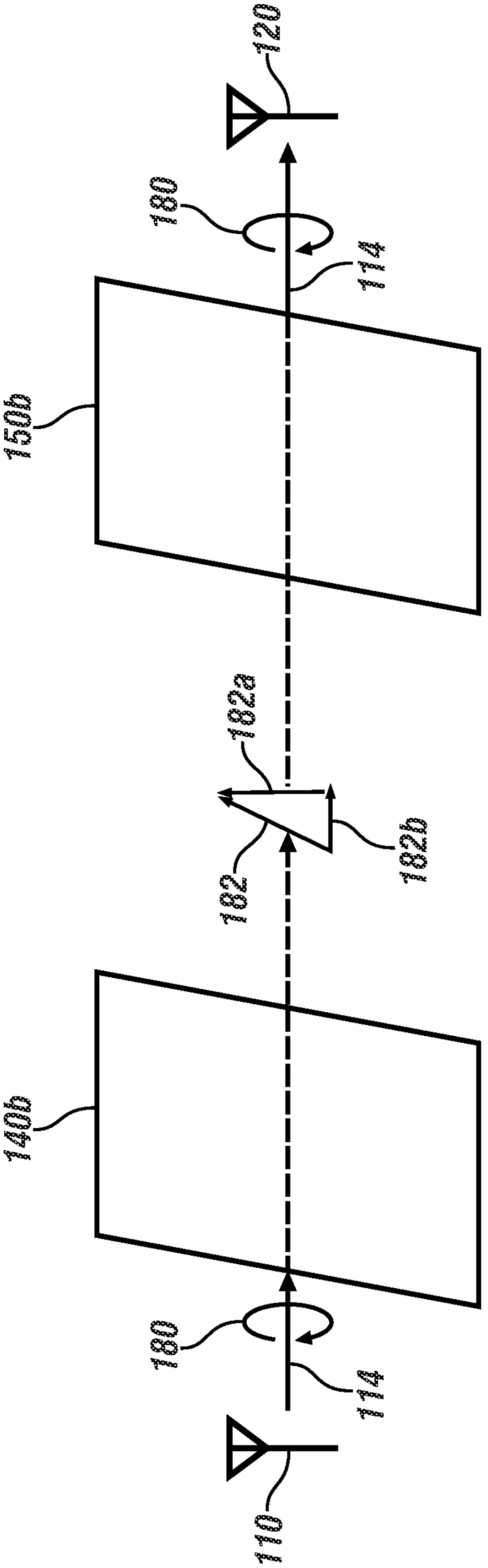
FIG. 6 is a schematic diagram of circular-to-linear and linear-to-circular electromagnetic polarizers in accordance with one or more exemplary embodiments.

Referring to FIG. 6, a schematic diagram of example circular-to-linear and linear-to-circular electromagnetic polarizers is shown in accordance with one or more exemplary embodiments. In various embodiments, a circular-to-linear type of first electromagnetic polarizer 140*b* converts the first radio-frequency signal 114 from the circular polarization 180 to a linear polarization 182. A linear-to-circular type of second electromagnetic polarizer 150*b*, with a linear polarization perpendicular to that of the first circular-to-linear electromagnetic polarizer 140*b*, may convert the first radio-frequency signal 114 from the polarization 182 to the circular polarization 180. In various embodiments, the first electromagnetic polarizer 140*b* and the second electromagnetic polarizer 150*b* may be copies of each other and mounted with different orientations.

The first antenna 110 may generate the first radio-frequency signal 114 with the circular polarization 180. The first electromagnetic polarizer 140*b* is operational to change a polarization of the first radio-frequency signal 114 from the circular polarization 180 to the linear polarization 182. The first radio-frequency signal 114, where viewed between the first electromagnetic polarizer 140 and the second electromagnetic polarizer 150 (e.g., with the linear polarization 182), may be considered to have a vertical component 182*a* and a horizontal component 182*b*. The vertical component 182*a* may represent an attenuated version of the first radio-frequency signal 114.

The second electromagnetic polarizer 150*b* is operational to change a polarization of the first radio-frequency signal 114 from the linear polarization 182 back to the circular polarization 180. The first radio-frequency signal 114 converted back to the circular polarization 180 by the second electromagnetic polarizer 150*b* may represent an attenuated version of the first radio-frequency signal 114, where viewed between the first electromagnetic polarizer 140 and the second electromagnetic polarizer 150. In various embodiments, attenuation of the first radio-frequency signal 114 through the first electromagnetic polarizer 140*b* and the second electromagnetic polarizer 150*b* may be at least 20 decibels, relative to free space attenuation between the first antenna 110 and the second antenna 120.

A total attenuation of the first radio-frequency signal 114 as transmitted from the first antenna 110 until reception by the second antenna 120 may be at least −20 decibels. Therefore, while the first transceiver 102 and the first antenna 110 are transmitting and the second transceiver 104 and the second antenna 120 are receiving, the first radio-frequency signal 114 may be attenuated to a point where the first radio-frequency signal 114 would not disrupt conversion of the second radio-frequency signal 124 to a useable form in the second transceiver 104. Without the attenuation of the first electromagnetic polarizer 140/140*a*/140*b* and the second electromagnetic polarizer 150/150*a*/150*b*, the second transceiver 104 may be unable to distinguish between the first radio-frequency signal 114 and the second radio-frequency signal 124. Likewise, while the first transceiver 102 and the first antenna 110 are receiving and the second transceiver 104 and the second antenna 120 are transmitting, the second radio-frequency signal 124 may be attenuated to a point where the second radio-frequency signal 124 would not disrupt conversion of the first radio-frequency signal 114 to a useable form in the first transceiver 102.

Figure 7:
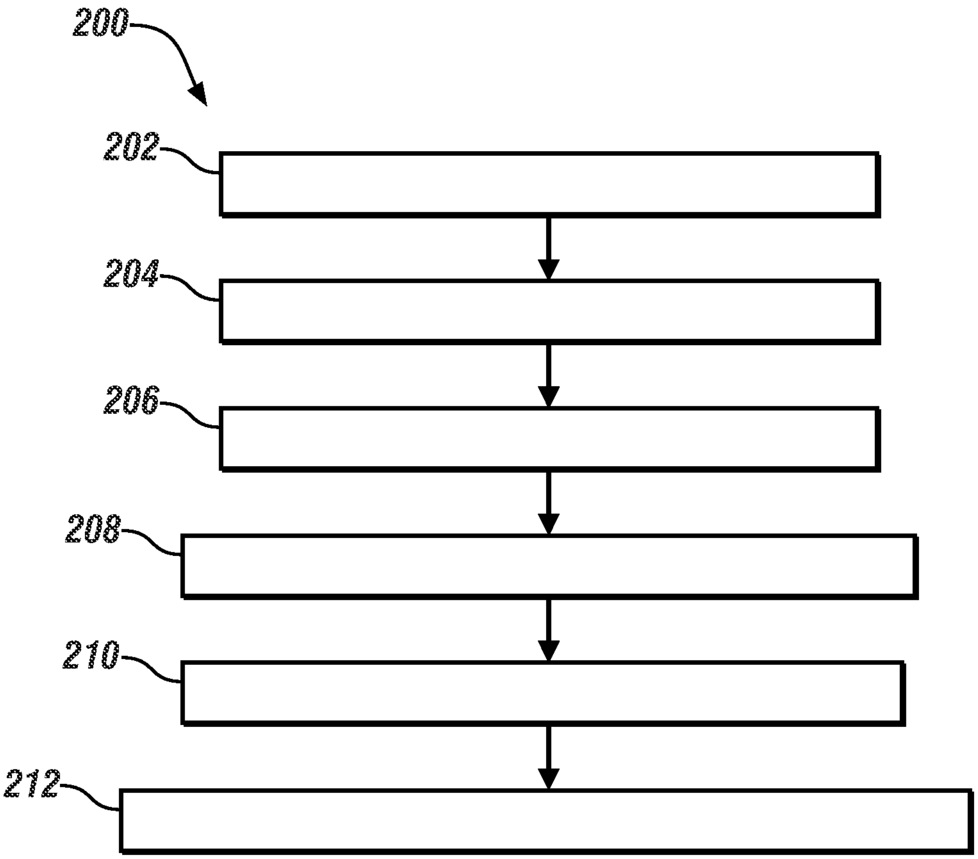
FIG. 7 is a flow diagram of a method for increasing isolation between antennas in accordance with one or more exemplary embodiments.

Referring to FIG. 7, a flow diagram of an example method 200 for increasing isolation between antennas is shown in accordance with one or more exemplary embodiments. The method (or process) 200 may be implemented by the antenna system 100, the first transceiver 102 and the second transceiver 104. The method 200 may include steps 202 to 212, as illustrated. The sequence of steps is shown as a representative example. Other step orders may be implemented to meet the criteria of a particular application. The example is based on the linear electromagnetic polarizers 140 and 150. Similar steps may be implemented for the other types of first electromagnetic polarizers 140*a*-140*b* and the other types of second electromagnetic polarizers 150*a*-150*b*.

In the step 202, the first antenna 110 may transmit the first radio-frequency signal 114 with the first polarization 116 or 180. Concurrently, the second antenna 120 may receive the second radio-frequency signal 124 with the first polarization 116 or 180 in the step 204. After passing through the first electromagnetic polarizer 140 and the second electromagnetic polarizer 150, an attenuated version of the first radio-frequency signal 114 is received at the second antenna 120 in the step 206. The first radio-frequency signal 114 as transmitted from the first antenna 110 may disrupt conversion of the second radio-frequency signal 124 received by the second antenna 120 to a useable form if the first radio-frequency signal 114 is received unattenuated at the second antenna 120.

In the step 208, a portion of the first radio-frequency signal 114 transmitted by the first antenna 110 toward the second antenna 120 is attenuated by approximately 20 decibels with the first electromagnetic polarizer 140 and the second electromagnetic polarizer 150. The attenuation may include changing the first polarization 116 of the first radio-frequency signal 114 to the second polarization 146 with the first electromagnetic polarizer 140. The changing of the first polarization 116 of the first radio-frequency signal 114 with the first electromagnetic polarizer 140 includes passing a first component of the first radio-frequency signal through the first electromagnetic polarizer 140 and rejecting a second component of the first radio-frequency signal 114 with the first electromagnetic polarizer 140.

In the step 210, a horizontal component 170 of the first radio-frequency signal 114 at the second antenna 120 may be maintained across the gap 164 of the conductive ground plane 160. The second polarization 146 of the first radio-frequency signal 114 is changed to the third polarization 156 with the second electromagnetic polarizer 150 in the step 212. The changing may include passing a third component of the first radio-frequency signal 114 though the second electromagnetic polarizer 150 and rejecting a fourth component 147 of the first radio-frequency signal 114 with the second electromagnetic polarizer 150.

In various embodiments, the antenna system 100 includes +/−45 linear electromagnetic polarizers (from linear-to-linear slant of +/−45 degree polarization) to increase isolation between two linear-polarized antennas (both vertical or both horizontal). Placement of the +45 degree electromagnetic polarizer for one antenna and the −45 degree electromagnetic polarizer for the other antenna, where the electromagnetic polarizers are between the antennas, makes the radiation patterns in an angle between the antennas perpendicular, therefor increasing the isolation between the antennas. While increasing isolation between the antennas, the electromagnetic polarizers do not affect a radiation pattern shape of the antennas. In other words, for a small cost of reduced antenna gain in a certain direction, one achieves a better isolation between antennas without redesigning the antennas.

In a case where the antennas are situated above a ground/conducting plane (such as vertical polarized antennas above a metal sheet), the +/−45 polarized signals quickly reduce to a vertical polarized signal, due to the ground effect on the horizontal component. The reduction to vertical may be overcome by making a gap/hole in the conductive ground plane that is between and under the electromagnetic polarizers. Simulations and/or experiments may be used to determine a distance of the antenna to each electromagnetic polarizer, a minimal height and a minimum width of the electromagnetic polarizers, a minimal amount of layers of each electromagnetic polarizer, and a distance between the electromagnetic polarizers In various embodiments, the antenna system may include more than two antennas. Each pair of antennas may be surrounded by a pair of the linear electromagnetic polarizers, the linear-to-circular electromagnetic polarizers, or the circular-to-linear electromagnetic polarizers such that relative to each other, the polarizations may be perpendicular. A benefit may be achieving a good isolation between antennas (e.g., adding −20 dB of isolation), without having to redesign or increase the distance between the antennas. A trade-off is 3 decibels less gain in the original polarization in the angle of coverage between the antennas and the nearby electromagnetic polarizers. In other embodiments, the antennas may be operated in mutually exclusive states where while one antenna is broadcasting the other antennas are not being utilized.

Embodiments of the disclosure generally provide an antenna system that includes a first antenna, a second antenna, a first electromagnetic polarizer, a second electromagnetic polarizer, and a conductive ground plane. The first antenna is operational to transmit a first radio-frequency signal with a first polarization. The second antenna is operational to receive a second radio-frequency signal with the first polarization and receive the first radio-frequency signal. The first radio-frequency signal would disrupt conversion of the second radio-frequency signal to a useable form if the first radio-frequency signal is received unattenuated at the second antenna. The first electromagnetic polarizer is disposed between the first antenna and the second antenna and operational change the first polarization of the first radio-frequency signal to a second polarization. The second polarization is offset relative to the first polarization by a first predetermined angle. The second electromagnetic polarizer is disposed between the first electromagnetic polarizer and the second antenna and operational change the second polarization of the first radio-frequency signal to a third polarization. The third polarization is offset relative to the first polarization by a second predetermined angle. The first electromagnetic polarizer and the second electromagnetic polarizer may attenuate the first radio-frequency signal at the second antenna so that the second radio-frequency signal is convertible to the useable form. The conductive ground plane is disposed on a ground side of the first antenna and the second antenna. The conductive ground plane defines a gap between the first antenna and the second antenna. The gap extends under the first electromagnetic polarizer. The gap extends under the second electromagnetic polarizer. The conductive ground plane is operational to maintain a horizontal component of the first radio-frequency signal across the gap.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. An antenna system comprising:

a first antenna operational to transmit a first radio-frequency signal with a first polarization;

a second antenna operational to receive a second radio-frequency signal with the first polarization and receive the first radio-frequency signal, wherein the first radio-frequency signal would disrupt conversion of the second radio-frequency signal to a useable form if the first radio-frequency signal is received unattenuated at the second antenna;

a first electromagnetic polarizer disposed between the first antenna and the second antenna and operational change the first polarization of the first radio-frequency signal to a second polarization, wherein the second polarization is offset relative to the first polarization by a first predetermined angle;

a second electromagnetic polarizer disposed between the first electromagnetic polarizer and the second antenna and operational change the second polarization of the first radio-frequency signal to a third polarization, wherein the third polarization is offset relative to the first polarization by a second predetermined angle, and the first electromagnetic polarizer and the second electromagnetic polarizer attenuate the first radio-frequency signal at the second antenna so that the second radio-frequency signal is convertible to the useable form; and a conductive ground plane disposed on a ground side of the first antenna and the second antenna, wherein the conductive ground plane defines a gap between the first antenna and the second antenna, the gap extends under the first electromagnetic polarizer, the gap extends under the second electromagnetic polarizer, and a horizontal component of the second polarization of the first radio-frequency signal is maintained across the gap.

2. The antenna system according to claim 1, wherein the first electromagnetic polarizer is operational to:

pass a first component of the first radio-frequency signal; and reject a second component of the first radio-frequency signal.

3. The antenna system according to claim 2, wherein the second electromagnetic polarizer is operational to:

pass a third component of the first radio-frequency signal; and reject a fourth component of the first radio-frequency signal.

4. The antenna system according to claim 1, wherein a portion of the first radio-frequency signal transmitted by the first antenna toward the second antenna is attenuated approximately 20 decibels after passing through the first electromagnetic polarizer and the second electromagnetic polarizer, relative to free space attenuation between the first antenna and the second antenna.

5. The antenna system according to claim 1, wherein the second predetermined angle is approximately perpendicular to the first predetermined angle.

6. The antenna system according to claim 5, wherein:

the first predetermined angle is slanted approximately 45 degrees relative to the conductive ground plane; and the second predetermined angle is slanted approximately −45 degrees relative to the conductive ground plane.

7. The antenna system according to claim 1, wherein the first electromagnetic polarizer is operational to change the first radio-frequency signal from a circular polarization to a linear polarization at the first predetermined angle.

8. The antenna system according to claim 7, wherein the second electromagnetic polarizer is operational to:

change the first radio-frequency signal from the linear polarization to the circular polarization; and reject a component of the first radio-frequency signal.

9. The antenna system according to claim 1, wherein the first antenna and the second antenna are mounted on a vehicle.

10. A method for establishing isolation between antennas, comprising:

transmitting a first radio-frequency signal with a first polarization from a first antenna;

receiving a second radio-frequency signal with the first polarization at a second antenna;

receiving the first radio-frequency signal at the second antenna, wherein the first radio-frequency signal would disrupt conversion of the second radio-frequency signal to a useable form if the first radio-frequency signal is received unattenuated at the second antenna;

changing the first polarization of the first radio-frequency signal to a second polarization with a first electromagnetic polarizer, wherein the first electromagnetic polarizer is disposed between the first antenna and the second antenna, and the second polarization is offset relative to the first polarization by a first predetermined angle;

changing the second polarization of the first radio-frequency signal to a third polarization with a second electromagnetic polarizer, wherein the second electromagnetic polarizer is disposed between the first electromagnetic polarizer and the second antenna, the third polarization is offset relative to the first polarization by a second predetermined angle, and the first electromagnetic polarizer and the second electromagnetic polarizer attenuate the first radio-frequency signal at the second antenna so that the second radio-frequency signal is convertible to the useable form; and maintaining a horizontal component of the second polarization of the first radio-frequency signal across a gap in a conductive ground plane, wherein the conductive ground plane is disposed on a ground side of the first antenna and the second antenna, the conductive ground plane defines the gap between the first antenna and the second antenna, the gap extends under the first electromagnetic polarizer, and the gap extends under the second electromagnetic polarizer.

11. The method according to claim 10, wherein the changing of the first polarization of the first radio-frequency signal comprises:

passing a first component of the first radio-frequency signal through the first electromagnetic polarizer; and attenuating a second component of the first radio-frequency signal with the first electromagnetic polarizer.

12. The method according to claim 11, wherein the changing of the second polarization of the first radio-frequency signal comprises:

passing a third component of the first radio-frequency signal through the second electromagnetic polarizer; and rejecting a fourth component of the first radio-frequency signal with the electromagnetic polarizer.

13. The method according to claim 10, further comprising:

attenuating a portion of the first radio-frequency signal transmitted by the first antenna toward the second antenna by approximately 20 decibels with the first electromagnetic polarizer and the second electromagnetic polarizer, relative to free space attenuation between the first antenna and the second antenna.

14. The method according to claim 10, wherein the second predetermined angle is approximately perpendicular to the first predetermined angle.

15. The method according to claim 14, wherein:

the first predetermined angle is slanted approximately 45 degrees relative to the conductive ground plane; and the second predetermined angle is slanted approximately −45 degrees relative to the conductive ground plane.

16. The method according to claim 10, wherein the changing of the first polarization of the first radio-frequency signal comprises:

changing the first radio-frequency signal from a circular polarization to a linear polarization at the first predetermined angle with the first electromagnetic polarizer.

17. The method according to claim 16, wherein the changing of the second polarization of the first radio-frequency signal comprises:

changing the first radio-frequency signal from the linear polarization to the circular polarization with the second electromagnetic polarizer; and rejecting a component of the first radio-frequency signal with the second electromagnetic polarizer.

18. A vehicle comprising:

an exterior surface;

a first antenna disposed on the exterior surface and operational to transmit a first radio-frequency signal with a first polarization;

a second antenna disposed on the exterior surface and operational to receive a second radio-frequency signal with the first polarization and receive the first radio-frequency signal, wherein the first radio-frequency signal would disrupt conversion of the second radio-frequency signal to a useable form if the first radio-frequency signal is received unattenuated at the second antenna;

a first electromagnetic polarizer disposed between the first antenna and the second antenna and operational change the first polarization of the first radio-frequency signal to a second polarization, wherein the second polarization is offset relative to the first polarization by a first predetermined angle;

a second electromagnetic polarizer disposed between the first electromagnetic polarizer and the second antenna and operational change the second polarization of the first radio-frequency signal to a third polarization, wherein the third polarization is offset relative to the first polarization by a second predetermined angle, and the first electromagnetic polarizer and the second electromagnetic polarizer attenuate the first radio-frequency signal at the second antenna so that the second radio-frequency signal is convertible to the useable form; and a conductive ground plane disposed on a ground side of the first antenna and the second antenna, wherein the conductive ground plane defines a gap between the first antenna and the second antenna, the gap extends under the first electromagnetic polarizer, the gap extends under the second electromagnetic polarizer, and a horizontal component of the second polarization of the first radio-frequency signal is maintained across the gap.

19. The vehicle according to claim 18, wherein the first antenna and the second antenna are positioned on a longitudinal axis of the vehicle.

20. The vehicle according to claim 18, wherein the first radio-frequency signal is a vehicle-to-vehicle signal and the second radio-frequency signal is a Wi-Fi signal.

* * * * *